(12) United States Patent
Fujieda et al.

(10) Patent No.: US 7,212,672 B2
(45) Date of Patent: May 1, 2007

(54) IMAGE PROCESSING APPARATUS AND IMAGE PROCESSING METHOD

(75) Inventors: Shiro Fujieda, Otokuni-gun (JP); Toshihiko Matsumoto, Kyoto (JP); Yuji Suzuki, Ayabe (JP)

(73) Assignee: Omron Corporation, Kyoto (JP)

( * ) Notice: Subject to any disclaimer, the term of this patent is extended or adjusted under 35 U.S.C. 154(b) by 761 days.

(21) Appl. No.: 10/681,373

(22) Filed: Oct. 9, 2003

(65) Prior Publication Data
US 2004/0131256 A1    Jul. 8, 2004

(30) Foreign Application Priority Data
Oct. 11, 2002  (JP)  ............................. 2002-299581

(51) Int. Cl.
*G06K 9/48*  (2006.01)
(52) U.S. Cl. .................................... 382/199
(58) Field of Classification Search ............... 382/103, 382/151, 169, 190, 197, 199, 209, 218, 291, 382/305
See application file for complete search history.

(56) References Cited

U.S. PATENT DOCUMENTS 5,081,689 A * 1/1992 Meyer et al. ............... 382/199
6,141,437 A   10/2000 Xin-Wei
6,625,303 B1* 9/2003 Young et al. ............... 382/132
6,885,771 B2* 4/2005 Takahashi ................... 382/199
7,116,823 B2* 10/2006 Clark et al. ................. 382/199
2002/0063893 A1  5/2002 Fujieda

FOREIGN PATENT DOCUMENTS

JP   2002-230562 A   8/2002

* cited by examiner

*Primary Examiner*—Daniel Miriam
(74) *Attorney, Agent, or Firm*—Foley & Lardner LLP

(57) ABSTRACT

An image processing method and an image processing apparatus are disclosed, in which curved linear objects and uneven linear objects as well as rectilinear objects can be detected easily and accurately. Edge pixels P1 extracted from a gray-scale image to be processed are sequentially considered to search for an edge pixel having an opposite direction of density gradient to each of the edge pixels P1 within the range of a predetermined length W along the direction orthogonal to the edges. Once an edge pixel P2 meeting these conditions is extracted, a line segment having a length L is set extending in the direction C parallel to the edge of the edge pixels P1 from an intermediate point Q between the extracted edge pixel P2 and the edge pixel P1 under consideration.

19 Claims, 6 Drawing Sheets

IMAGE PROCESSING APPARATUS AND IMAGE PROCESSING METHOD

BACKGROUND OF THE INVENTION

1. Field of the Invention

The present invention relates to an image processing method and an image processing apparatus for detecting a linear object such as a linear scar, a hair and thread waste (hereinafter referred to collectively as "the linear object") in the field of the gray-scale image data processing by the computer.

2. Description of the Prior Art

A conventional image processing method for detecting a linear defect is available in which images are picked up sequentially by scanning a line camera in the direction orthogonal to the arrangement of the image pickup elements, and a line of images obtained each time are processed. According to this method, a position with a different density is detected by binarizing a line of images, or the sum of densities is taken for each line so that the density sum for a line is compared to the density sum for the preceding and following lines. In this way, it is determined whether each line contains a linear defect or not.

On the other hand, the present applicant has recently developed an image processing method, as disclosed in Japanese Unexamined Patent Publication No. 2002-230562, in which the angle data (edge codes) indicating the edge direction of edge pixels contained in a gray-scale image are acquired, and a linear contour line (edges) is detected with high accuracy by the image processing using the edge codes. In this method, a histogram indicating the degree of an edge pixel corresponding to the value of each edge code is produced, and an edge pixel for an angle corresponding to each peak on the histogram is assigned a label unique to the particular peak. In the label image generated by the labeling process, a mass of successive edge images having the same label is verified to correspond to a line segment, and a unique label is assigned to each mass. In this way, various feature amounts are calculated and the line segments are integrated. After that, the process of specifying a line segment meeting the extraction conditions is executed.

In particular, the part of the specification of the aforementioned publication associated with FIG. 13 discloses a method of extracting a set of parallel line segments as a technique for specifying a line segment meeting the extraction conditions. Further, the same part of the same specification indicates that a linear scar or the like object having a very small width formed on the package can be extracted by setting a very small distance between the line segments to be extracted.

In the conventional method described first above in which a defect is detected by binarizing images acquired by a line camera or comparing the density sums for each line, the prerequisite is that the density of the background portion other than the defect is uniform in density and the density of the defect portion is considerably different from that of the background portion. A defect is difficult to detect, therefore, for an image low in contrast or having a background of uneven density due to a foul or a pattern.

According to the method described in the cited patent publication, in contrast, the detection is possible even in the case where the contrast of the image is decreased or the density variation of the background is increased. In this conventional method, however, a mass of a succession of images having the same edge code are required to be basically detected. Therefore, only rectilinear contour lines can be detected, and it is difficult to detect curved linear objects such as hairs and thread waste. It is also difficult to detect a finely uneven linear object such as a crack since the edge code is frequently changed at the uneven portion.

According to the method described in the cited patent publication, even in the case where the edge of a linear object can be extracted only partly in an image of low contrast, the portions not extracted can be complemented by the process of integrating the line segment. In this integrating process, however, it is necessary to confirm for each extracted line segment whether it can be integrated or not, using the feature amounts of each line segment. This increases the burden of the control operation, and the method is difficult to employ in such an application as a high-speed defect inspection which is conducted by sequentially picking up images of products conveyed on the conveyor.

SUMMARY OF THE INVENTION

The invention has been developed in view of the problems described above, and an object thereof is to provide an image processing method and an image processing apparatus, in which curved linear objects and uneven linear objects as well as rectilinear objects can be easily detected with high accuracy.

Another object of the invention is to provide an image processing method and an image processing apparatus, in which a linear object can be detected at high speed with high accuracy even in an image with a low edge extraction accuracy of the linear object.

Still another object of the invention is to provide an image processing method and an image processing apparatus, in which optimum parameters for detecting a linear object can be easily set by determining whether the set values are proper or not.

Yet another object of the invention is to provide an image processing method and an image processing apparatus, in which parameters for detecting a linear object can be automatically set using a predetermined number of model images of a linear object.

According to this invention, the edge pixels contained in a gray-scale image are extracted, and the image is processed using the edge direction and the direction of the density gradient of the edge pixels.

The edge pixels are defined as those pixels making up the contour line of an object in a gray-scale image. The edge pixels are extracted preferably in such a manner that the degree of the density gradient of each pixel on the gray-scale image (hereinafter referred to as "the edge intensity") is determined and then those pixels having an edge intensity larger than a predetermined value are determined as edge pixels.

The direction of density gradient is defined as the direction in which density changes with a given edge pixel as a boundary, and can be determined by the differentiation process using the particular edge pixel and a predetermined number of neighboring pixel data. The edge direction, as in the patent publication cited above, is defined as the direction obtained by rotating the direction of density gradient by +90 degrees or −90 degrees.

Assume that a linear object to be detected appears with a width of at least several pixels on the gray-scale image. Two contour lines substantially parallel to the length of the linear object can be extracted by the edge extraction process for the gray-scale image. Each of these contour lines is configured of a plurality of edge pixels.

Also, assume that a straight line orthogonal to one of the two contour lines is set. The direction of the density gradient of an edge pixel corresponding to the crossing point between a contour line and the straight line is opposite to the direction of density gradient of the other edge pixel (the two edge pixels corresponding to the points crossing the straight line are hereinafter referred to as "the opposed edge pixels"). This opposed relation also applies to the relation of the edge direction, so that the edge direction of the edge pixel at an arbitrary position on one contour line is substantially opposite to the edge direction of the edge pixel opposed to the first edge pixel on the other contour line.

According to the invention, based on this principle, not only a rectilinear object but also a curved linear object or a linear object having an irregularly uneven contour can be detected on a gray-scale image. In one image processing method according to the invention, the edge pixels are extracted from a gray-scale image to be processed, and while sequentially considering the extracted edge pixels, an edge pixel verified to have an opposite direction of density gradient to the edge pixel under consideration is searched for within a predetermined range in the direction orthogonal to the edge direction of the edge pixel under consideration. At the same time, upon successful extraction of an edge pixel satisfying the verification conditions, a line segment parallel to the edge direction of the edge pixel under consideration is set which passes through a predetermined point on a line connecting the extracted edge pixel to the edge pixel under consideration. Once the pixels to be considered are depleted, an image indicating the result of setting the line segment is displayed as an image indicating the result of detecting a linear object.

The search range in the search process can be indicated, for example, by the distance from a pixel with which the search is started to a pixel at which the search is terminated in the direction orthogonal to the edge direction of the edge pixel under consideration (hereinafter referred to as "the reference direction"). The pixel with which the search is started is not limited to the edge pixel under consideration, but may alternatively be a pixel away from the edge pixel under consideration by a predetermined distance in the reference direction.

The distance representing the search range may be indicated by the number of pixels. In the case where the search is not started from the edge pixel under consideration, the search range can be indicated by the distance from the edge pixel under consideration to the pixel with which the search is started and the distance from the edge pixel under consideration to the pixel at which the search is terminated.

Further, an area within a predetermined angle to the reference direction can be defined as a search range. In this case, the search range is indicated by the angle to the reference direction in addition to the distances described above.

The length of each distance described above is preferably set in accordance with the width of the linear object to be detected. By doing so, as long as the edge pixel under consideration constitutes the contour line of the linear object, an edge pixel verified to have the direction of density gradient opposite to that of the edge pixel under consideration can be extracted within the search range.

With regard to a linear object having a considerably varied width and not necessarily considered to have two parallel contour lines or a linear object having a large radius of curvature, the direction of density gradient of the opposed edge pixel is not always opposite to that of the edge pixel under consideration, but the direction of density gradient of an edge pixel located in the neighborhood of the opposed edge pixel is opposite to that of the edge pixel under consideration. By adjusting the angle to the reference direction in accordance with the state of the linear object to be detected, therefore, an edge pixel satisfying the verification conditions can be extracted.

Further, the search process, which may be started with an edge pixel under consideration, may alternatively be started with a pixel located a predetermined distance away from the edge pixel under consideration.

The verification as to whether the direction of density gradient is opposite or not can be made by determining whether the difference of the direction of density gradient between the edge pixel under consideration and the pixel to be searched for is within a predetermined allowable range with respect to 180 degrees. The allowable range in this determining process can be arbitrarily set in accordance with the state of a linear object to be detected, like in the adjustment of the angle to the reference direction described above.

In the case where it is desired to detect only a substantially rectilinear object, for example, the allowable range is desirably set to a small value. In detecting a linear object having a radius of curvature, a linear object having irregularly uneven contour lines or a linear object having varied widths between the two contour lines, on the other hand, the allowable range is desirably large.

In view of the fact that the edge direction is determined based on the direction of density gradient, the search process may be executed to search for a pixel that can be verified to have an opposite edge direction to the pixel under consideration.

In the line segment setting process, a line segment parallel to the edge direction of the edge pixel under consideration is set to pass through a predetermined point on a line connecting the edge pixel extracted by the search process to the pixel under consideration. For example, this line segment can be extended in the same direction as the edge direction of the edge pixel under consideration.

In the line segment setting process, a line segment can also be set to extend along the direction opposite to the edge direction of the edge pixel under consideration. As an alternative, a line segment can be set to extend in both the edge direction and the opposite direction.

In the search process of the image processing method according to this invention, at least a set of opposed edge pixels having the direction of density gradient about 180 degrees different from each other are extracted from the edge pixels making up the two contour lines substantially parallel to the length of the linear object. Further, a line segment parallel to the edge direction of each set of the edge pixels is set by the line segment setting process. The line segments thus set are superposed one on the other or connected to each other, thereby making it possible to generate an image accurately reflecting the position, size and the inclination of the linear object. By displaying this image, therefore, the detection result of the linear object can be shown in an easy-to-understand way.

Also, according to this method, even in the case where the density distribution of the background is varied, there is less chance of the detection accuracy of the linear object being reduced by the noises in the background portion, in view of the fact that sets of the edge pixels making up the contour lines of the linear object can be specified with high accuracy by the search process described above. Also, even in the case where the contrast of the image is so low that a linear object on the image is displayed in segments, the line segments can be connected to complement the segmented portions of the linear object by adjusting the length of the line segments set in the line segment setting process. In this way, the linear object can be stably detected without regard to the contrast.

In the line segment setting process, a line segment can be set at an arbitrary position between the searched pixel and the pixel under consideration (which position may be an intermediate point between the searched pixel and the pixel under consideration or the position of each pixel). Also, the line segment can be set at a plurality of positions between the pixels.

In the image processing method according to a preferred embodiment of the invention, a numerical input indicating the search range setting conditions in the search process is received. According to a more preferred embodiment, a numerical input indicating the line segment setting conditions is received.

The search range setting conditions may include the distance from the pixel with which the search is started to the pixel with which the search is ended and the angle to the reference direction. One of the distance and the angle may be fixed while the other may be changed. Especially in the case where a linear object to be processed has no extreme variation in line width, the angle to the reference direction is set to 0 degree and the search range is indicated only by the distance.

The above-mentioned distance can be indicated by the distance from an edge pixel to the pixel with which the search is started (hereinafter referred to as "the lower limit value") and the distance from the edge pixel to the pixel with which the search is ended (hereinafter referred to as "the upper limit value"). Nevertheless, both the upper limit value and the lower limit value are not necessarily set, but only one of them. In the case where the search is started from an edge pixel or an adjoining pixel, for example, only the upper limit value is set.

For the same reason, the search range can also be set in detail in terms of angle.

The line segment setting conditions may include the width of the line segment and the number of the line segments to be set, as well as the length of the line segment to be set. An increased length or width of the line segment can increase the degree to which the line segments are superposed one on the other. By adjusting these values, therefore, the optimum superposition of the line segments reflecting the features of the linear object to be detected can be obtained.

In the case where numerical values indicating the search range setting conditions or the line segment setting conditions can be input as in the aforementioned case, the detection process can be executed while variously changing the set values of the search range and the line segment using a model image before starting the full-scale detection process. It is therefore possible to determine whether the set values are proper or not from the image on display. Thus, parameters suitable for the detection process can be set easily and accurately.

Further, in the image processing method according to another embodiment of the invention, a numerical value corresponding to the edge intensity of an edge pixel under consideration is added to the density value of the constituent pixels of a line segment to be set in the line segment process, and thus an image indicating the result of setting the line segment is generated.

In this image processing method according to the invention, the line segments individually set between a plurality of neighboring edge pixels of the contour of a linear object are liable to be superposed one on the other. According to this embodiment of the invention, the weight due to the edge intensity of each edge pixel superposed is added to the superposed portion of the line segments, and therefore an image representing the feature of the linear object can be displayed more significantly. Specifically, the higher the edge intensity of the edge pixels, the larger the density value of the pixels constituting the line segment to be set. The larger the density gradient of the linear object, therefore, the higher the density with which the line segment can be set.

With regard to the noises having small density gradient due to the density irregularities, on the other hand, a plurality of line segments, if set and superposed, are less weighted. In an image indicating the detection result of a linear object, therefore, the line segments corresponding to the linear object can be clearly indicated in distinction from noises.

In this way, the detection result of a linear object can be indicated more clearly by differentiating the weight of the linear object in accordance with the edge intensity of the edge pixels under consideration.

According to a more preferred embodiment of the invention, an image indicating the result of setting the line segment is binarized by a predetermined threshold value, and the resultant binary image is displayed as the result of detecting the linear object. By doing so, only the portions where the line segments are superposed to a large degree and the portions weighted more by the edge intensity can be displayed. Therefore, the noise component can be eliminated from the object to be displayed, thereby making it possible to indicate the detection result of the linear object more clearly.

Further, in the image processing method according to still another preferred embodiment, the edge intensity of the edge pixel under consideration is reflected in the length or width of the line segment to be set in the line segment setting process. The higher the edge intensity of the edge pixel under consideration, for example, the more the width or the length of the line segment can be increased.

According to this embodiment, the line segment of the linear object to be detected can be indicated more emphatically than the line segment due to other noises, and therefore the result of detecting the linear object can be indicated more clearly.

Further, in the image processing method according to a still more preferred embodiment, upon extraction of an edge pixel meeting the verification conditions by the search process, the extracted edge pixel is determined as a post-consideration edge pixel after the line segment setting process.

The post-consideration edge pixel is defined as an edge pixel that has already been processed as an object of the search process or the line segment setting process. In the process of setting the extracted pixel as a post-consideration edge pixel, the edge intensity of the particular pixel is set to zero or otherwise the data indicating the density gradient is modified. As an alternative, a flag indicating that the particular edge pixel has already been processed is attached to the edge pixel while maintaining the density gradient thereof.

According to this embodiment, each set of opposed edge pixels having the direction of a density gradient about 180 degrees different from each other in two contour lines can be subjected to only one search process and one line segment setting process, and therefore the processing speed is increased. In this case, the line segment is extended in both the edge direction of the edge pixel under consideration and the opposite direction in the line segment setting process.

Then, the line segment can be set in a similar manner to the case where all the extracted edge pixels are sequentially processed.

Next, in another image processing method according to the invention, the edge pixels of a gray-scale image are extracted and sequentially considered, while executing the search process and the line segment setting process similar to the aforementioned case. When there is no edge pixels to be considered, the position or size of the linear object on the gray-scale image is detected based on the result of setting the line segment.

The position of the center of gravity of the integrated unit of the line segments can be determined as the position of the linear object. The size of the linear object, on the other hand, can be determined as the area, length or the peripheral length of the integrated unit of the line segments.

Further, the image processing method according to this invention comprises the step of inputting a predetermined number of gray-scale images including an image of a linear object, the step of receiving the operation of designating a linear object on each gray-scale image, the step of executing the search process and the line segment setting process for each input gray-scale image while at the same time changing the values of the parameters for the respective processes and executing the process of detecting the linear object based on the result of setting the line segment, and the step of selecting an optimum set of the parameter values based on the result of detecting the linear object and the result of designating the linear object for each gray-scale image.

The parameters for the search process are numerical values indicating the search range setting conditions, and the parameters for the line segment setting process are numerical values indicating the line segment setting conditions. These parameters are similar to those described above. The distance from the pixel with which the search is started to the pixel with which the search is terminated and the angle formed to the reference direction can be used as the parameters for the line segment setting process. On the other hand, the length, width and the number of the line segments set can be used as the parameters for the line segment setting process. The parameters are not limited to a single numerical value, but may include a plurality of numerical values such as the upper limit and the lower limit of the values described above.

In the process for designating a linear object on the gray-scale image, the coordinates of the pixels making up the linear object on the gray-scale image can be set. Nevertheless, all the constituent pixels are not necessarily designated, but the pixels on the contour lines of the linear object or a predetermined image area in the linear object may be designated. Based on the designation result, the constituent pixels of the linear object may be determined. The designating operation can be performed by scanning the mouse or the like pointing device on the gray-scale image display screen or by use of an input device such as the console or the keyboard.

In the method described above, the search process and the line segment setting process are executed on each gray-scale image of which a linear object has been designated, while changing the search range or the line segment setting conditions thereby to detect a linear object. In this process of detecting the linear object, as described above, a representative point such as the center of gravity alone may be determined. It is, however, more desirable to detect, as constituent pixels of a linear object, a plurality of pixels having a density value not less than a predetermined level, or a plurality of pixels corresponding to the positions where a predetermined number of line segments are superposed.

In an example process of selecting an optimum set of parameter values, the pixels detected as those constituting the linear object are checked to see whether they are included in the designated linear object or not, and the result of this determination is digitized as "1" or "0". Further, the process of determining the total of the numerical values indicating the determination result as an assessment value is executed for each set of parameter values, and the set of parameter values associated with the highest assessment value is selected as an optimum set. This determining process can be executed not only for the constituent pixels of the linear object but also for the pixels making up the background.

In the process of detecting the linear object, assume that the feature amounts such as the center of gravity and the length of the linear object are determined. The feature amount determined for each set of parameter values is compared to the feature amount of the designated linear object, and the set of parameter values nearest to the feature amount of the linear object is selected as an optimum set.

In this method, a predetermined number of gray-scale images including a model linear object to be detected are input, and by receiving the designation of the linear object in the images, the parameters most suitable for detecting the linear object can be automatically determined. In displaying the result of setting the line segment in binary form, the threshold value for the binarizing process can also be set automatically in similar manner.

According to another aspect of the invention, there is provided an image processing apparatus comprising image input means for inputting a gray-scale image to be processed, display means for displaying the result of detection of a linear object from the input gray-scale image, edge pixel detection means for detecting the edge pixels on the gray-scale image, search means for considering a redetermined edge pixel and searching for an edge pixel that can be verified to have an opposite direction of density gradient to that of the predetermined edge pixel under consideration within a predetermined range based on the direction orthogonal to the edge direction of the particular edge pixel under consideration, line segment setting means for setting, upon extraction of an edge pixel satisfying the verification conditions by the search means, a line segment parallel to the edge direction of the edge pixel under consideration at a predetermined position between the extracted edge pixel and the edge pixel under consideration, and control means for sequentially considering the edge pixels detected by the edge pixel detection means, operating the search means and the line segment setting means, and when there is no edge pixels to be considered, displaying on the display means an image indicating the result of setting the line segment by the line segment setting means.

The image input means is connected to the image generating means such as a camera or a scanner and fetches the gray-scale image generated by these means. The image input means is configured of an interface circuit and an A/D converter. Nevertheless, the image input means is not limited to this configuration, but may alternatively include a circuit for receiving an image transmitted by communication and a reader for reading an image stored in a predetermined memory.

The display means may be configured of an image display unit such as CRT or LCD and a corresponding interface circuit. The display means may further have the function of displaying the image input by the image input means and the result of detection by the edge image detection means, as well as the function of displaying the result of detection of a linear object.

The edge pixel detection means, the search means, the line segment setting means and the control means are implemented by a computer having built therein the software for executing the respective process. Each means can also be configured as a dedicated circuit such as ASIC (IC for special application) so that the collaborative operation of the dedicated circuits can be controlled by the computer. Also, a part of means (such as the edge pixel detection means) may be configured as a dedicated circuit, while the remaining means are implemented by the computer and the software. At the same time, the function of controlling the operation of the dedicated circuits may be incorporated in the computer.

In addition, this image processing apparatus desirably comprises a memory for individually storing the images input by the image input means, the edge images generated by the detection process of the edge detection means and the images indicating the result of setting the line segments by the line segment setting means.

With the image processing apparatus described above, the gray-scale image input by the image input means is subjected to the edge detection process, and the detected edge pixels, while being sequentially considered, are subjected to the process based on the image processing method described above, thereby producing a processing result image configured of a mass of line segments corresponding to the position, length and the shape of an linear object. From the image displayed on the display means, therefore, the shape and position of a linear object can be confirmed.

An image processing apparatus according to a preferred embodiment comprises input means for inputting the parameters used for the process of detecting a linear object. This input means can be configured as an input device such as the keyboard, mouse or the console or an interface for fetching the set value of the parameters. Further, this input means may have added thereto, as required, a computer and the software for developing on the display means, etc. a user interface for inputting the set values.

This input means is set so as to input numerical values indicating the search range setting conditions as parameters for the search process executed by the search means. According to a more preferred embodiment, the input means is also set so as to input numerical values indicating the line segment setting conditions as parameters for the line segment setting process executed by the line segment setting means. Specific examples of these parameters are similar to those employed in the image processing method according to the invention.

The input means described above makes it possible to execute the process of detecting a linear object while changing the values of the parameters freely. Prior to the full-scale detection process, therefore, the optimum values of the parameters can be determined while checking the processing result image displayed on the display means. Also, each time the features of the linear object to be detected undergo a change, the values of the parameters are changed or otherwise versatile measures are taken to contributed to a remarkably improved convenience.

According to another embodiment of the image processing apparatus, the control means, when there is no edge pixels to be considered, extracts constituent pixels of at least a predetermined number of the line segments set by the line segment setting means and superposed one on the other, and generates and displays on the display means a binary image of the extracted pixels in distinction from the other pixels.

In this embodiment, the portions where at least a predetermined number (assumed to be "N") of line segments are superposed are set as white (black), while the portions totally lacking the superposed line segments or the portions where the degree of superposition of the line segments is smaller than N are set as black (white). In this way, a binary image is generated and can be displayed. As a result, the image of a multiplicity of line segments superposed is kept displayed, while the image of the line segments of noises or the like having a smaller degree of superposition is erased. As described above, with regard of a linear object, the line segments set between neighboring edge pixels are more liable to be superposed. By adjusting the value N in accordance with the degree of superposition, therefore, the detection result of the linear object can be clearly indicated.

In the image processing apparatus according to another embodiment, the line segment setting means generates an image indicating the result of setting the line segments by adding a numerical value corresponding to the edge intensity of the edge pixel under consideration to the density value of the constituent pixels of the line segment to be set. In the image processing apparatus according to a more preferred embodiment, the control means binarizes the image indicating the result of setting the line segment by a predetermined threshold value when there is no edge pixels to be considered, and displays the resulting binary image on the display means.

With this configuration, even in the case where a background image having large density irregularities is processed, the noises due to the density gradient of the background portion have a smaller effect, thereby making it possible to clearly indicate the image of the line segment corresponding to the linear object.

In the image processing apparatus according to still another embodiment, the control means includes a post-consideration setting means which, upon extraction of an edge pixel satisfying the verification conditions, sets the extracted edge pixel as a post-consideration edge pixel after the completion of the line segment setting process by the line segment setting means. The post-consideration setting means changes the data of the extracted edge pixel (by reducing the edge intensity to zero, or otherwise) into a form not corresponding to the edge pixels. As an alternative, means may be provided in which the pixel data are maintained, while a flag is attached to the particular data indicating that the process has been executed.

In the post-consideration setting means described above, sets of opposed edge pixels between the two contour lines and having the direction of density gradient about 180 degrees different from each other are subjected to the search process and the line segment setting process only once, thereby making it possible to increase the speed of the process of detecting the linear object.

Further, the image processing apparatus described above may comprise detection means for detecting the position or size of a linear object on the gray-scale image based on the result of setting the line segment by the line segment setting means. This detection means makes it possible to indicate specific features of the linear object in a numerical value and therefore contributes to an improved convenience.

The result of detection by the detection means can be displayed on the display means together with the result of setting the line segment.

The image processing apparatus according to a more preferred embodiment comprises determining means for determining the presence or absence of a linear object based on the detection result described above and output means for outputting the presence/absence determination result. The determining means is implemented by a computer having set therein an algorithm for the determining process or a comparator for comparing the detection result to a predetermined threshold value. The output means is configured of an interface circuit or the like corresponding to a predetermined external equipment.

In the case where the output of the output means is applied to a lamp, a buzzer or the like device, such a device is activated upon acquisition of the determination result "linear object present". In this way, there is provided an image processing apparatus suitable for inspection of a linear defect. In the case where the output representing the presence/absence determination result is applied to a device having the control function such as a programmable controller or a personal computer, on the other hand, such a device coupled with an image processing apparatus makes it possible to construct a system for detecting and removing a linear defect.

Further, this image processing apparatus may comprise parameter setting means for setting an optimum value of each parameter in the form of a numerical value indicating the search range setting conditions for the search process by the search means and the line segment setting conditions for the line segment setting process by the line segment setting means. This parameter setting means includes designating operation means for designating a linear object on a gray-scale image upon receipt of a gray-scale image containing the linear object from the image input means, detection control means for operating the search means and the line segment setting means while changing the values of the parameters for each process of the search means and the line segment setting means, respectively, for a plurality of gray-scale images subjected to the designating operation, and thus executing the process of detecting a linear object based on the result of setting the line segment, and select means for selecting an optimum set of parameter values based on the detection result and the result of designating the linear object for each gray-scale image. The various parameters for each setting conditions are not limited to a single numerical value but may be a plurality of numerical values including the upper and lower limits of each value.

The configuration described above may include an interface circuit for receiving the designating operation of an input device such as the keyboard, mouse or the console, and also means for setting a user interface may be attached to the display means if required. The hardware portion of the designating operation means may be the same as the hardware portion for the input means.

The detection control means and the select means, which are required to process a multiplicity of gray-scale images at high speed, are desirably implemented by the computer software or other software used for the processing by the same detection control means and the select means.

With the configuration described above, the image processing method for automatically determining an optimum set of the values of parameters is implemented by inputting a plurality of model images of linear objects and designating the linear objects on these images. In this way, optimum parameters for detecting a linear object can be automatically set. Even those users not accustomed to the parameter setting process thus can easily accomplish the setting process required for detecting a linear object, thereby further improving the convenience of the apparatus.

The image processing apparatus having the configuration described above may constitute an inspection device for detecting a linear defect occurred in a predetermined object. This inspection device, whereby the position and the shape of a linear defect curved or having irregular uneven contour lines as well as the position and the shape of a rectilinear defect can be detected with high accuracy, improves the detection accuracy remarkably.

DETAILED DESCRIPTION OF THE INVENTION

Figure 1:
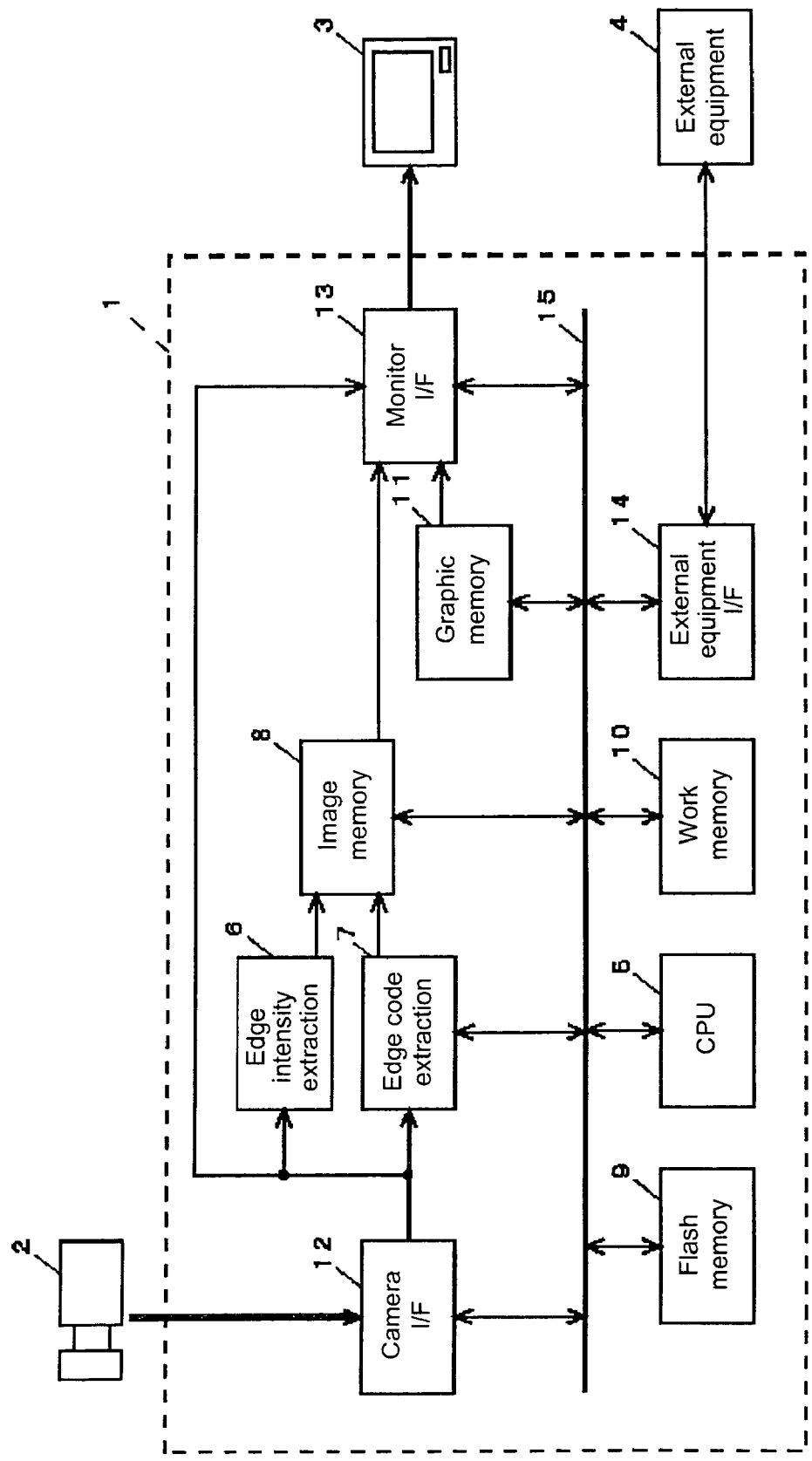
FIG. 1 is a block diagram showing a configuration of an image processing apparatus according to an embodiment of the invention.

FIG. 1 shows a configuration of an image processing apparatus according to an embodiment of the invention.

This image processing apparatus 1 is arranged in the neighborhood of an inspection line in a factory for conducting the inspection by sequentially picking up an image of products conveyed on the inspection line to check to see whether the image contains any image data on a linear defect or foreign matter. The apparatus 1 is connected with peripheral devices including a camera 2, a monitor 3 and an external equipment 4. The external equipment 4 includes a plurality of devices such as a console for inputting data and an alarm lamp for announcing the occurrence of a defect product. In addition, a programmable controller and a personal computer may be connected as the external equipment 4.

The image processing apparatus 1 includes a CPU 5 as a main component for the control operation, an edge intensity extraction unit 6, an edge code extraction unit 7, an image memory 8, a flash memory 9, a work memory 10, a graphic memory 11, interface circuits 12, 13 and 14 for the camera 2, the monitor 3 and the external equipment 4, respectively (hereinafter referred to as "the camera interface 12", "the monitor interface 13" and "the external equipment interface 14", respectively, "the interface" being expressed as "I/F" in FIG. 1).

The flash memory 9 has stored therein a program showing the processing steps of the CPU 5 and default values of various parameters. Also, the data set by the user such as the set values of parameters are written in the flash memory 9 as occasion demands.

The work memory 10 is used for reading and writing the work data generated during a series of control operation performed by the CPU 5. The graphic memory 11 has stored therein the data required for displaying a window indicating a measurement area 22, a screen for setting parameters and a cursor on the image.

The image memory 8 has a capacity sufficient to store a plurality of frames of images individually. The image memory 8 stores the image data output from the edge intensity extraction unit 6 and the edge code extraction unit 7 on the one hand and supplies the image data to the CPU 5 through a CPU bus 15 on the other hand. Further, the CPU 5 is adapted to write the image data associated with the processing result image described later in a predetermined memory area of the image memory 8.

The camera 2 is of such a type as to output a still image signal in analog form. The camera interface 12 includes an input port to the camera 2 and an A/D converter for converting an analog image signal fetched from the input port into a digital signal. The gray-scale image data after analog-to-digital conversion is supplied to the edge intensity extraction unit 6 and the edge code extraction unit 7 in parallel, and output to the monitor interface 13 at the same time.

The monitor interface 13, in addition to an output port to the monitor 3, includes a D/A converter, an image synthesizing circuit and a switching circuit. The image output from the image memory 8 or the graphic memory 11 or the gray-scale image from the camera interface 12 is synthesized into one or a plurality of images and output to the monitor 3. The output image switching operation of the monitor interface 13 is controlled by the CPU 5 that has received the switching operation from the console, etc.

The edge intensity extraction unit 6 and the edge code extraction unit 7 are chip parts including a shift register, a logic circuit and a lookup table. The edge intensity extraction unit 6 is for determining the magnitude of the density gradient (edge intensity) of each pixel of the gray-scale image input from the camera interface 12, and the edge code extraction unit 7 is for determining the angle data indicating the direction of the edges in each pixel (hereinafter referred to as "the edge code") from the same gray-scale image.

The edge intensity corresponds to the magnitude of the resultant vector of the density gradient vectors (which indicate the direction and magnitude of the density gradient) in X and Y directions of the edge pixels under consideration. According to this embodiment, the gray-scale image data is expressed with white level side by a high density value, and the direction of density gradient is defined as the direction of descending density. The edge code corresponds to the direction of density gradient rotated by +90 degrees or −90 degrees, and is expressed as an angle with respect to the positive direction along the X axis.

For a detailed method of calculating the edge intensity and the edge code, see the reference cited above. The edge intensity extraction unit 6 and the edge code extraction unit 7 according to this embodiment have a lookup table for determining the edge intensity and the edge code of the pixels at the center of a mask area of a predetermined size based on the density distribution in the mask according to the calculation formula described in the reference. In the extraction process, the density data of the pixels output from the camera interface 12 are sequentially fetched while accessing the lookup table thereby to extract the edge intensity and the edge code for each pixel at high speed.

The edge intensity extraction unit 6 generates an image having the edge intensitys arranged in accordance with the array of the pixels (hereinafter referred to as "the edge intensity image") and outputs it to the image memory 8. In similar fashion, the edge code extraction unit 7 generates an image with the extracted edge codes arranged in accordance with the pixel array (hereinafter referred to as "the edge code image") and outputs it to the image memory 8.

The CPU 5 executes the image processing operation described later using the edge intensity image and the edge code image stored in the image memory 8, and thus generates a processing result image showing the result of detecting a defect. Also, the CPU 5 determines the presence or absence of a defect by executing a predetermined measuring process for the processing result image, and outputs the determination result through the external equipment interface 14.

The image processing apparatus 1 according to this embodiment is intended to detect a linear defect as wide as several pixels occurring on the image. Therefore, the position at which the camera 2 is installed and the magnification thereof are required to be adjusted in such a manner that an image of a defect to be detected is picked up with a width as large as several pixels.

Figure 2:
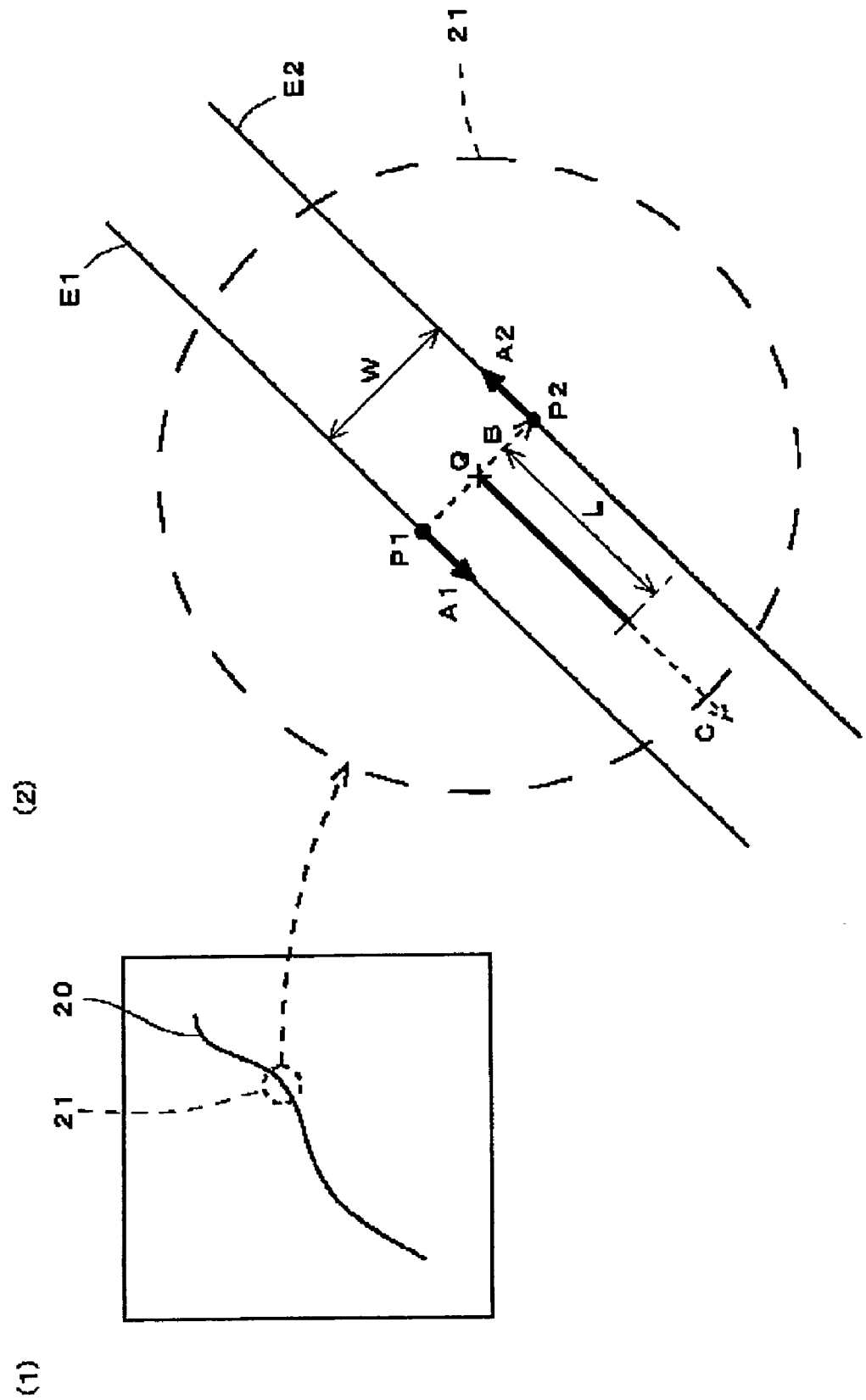
FIG. 2 is a diagram for explaining the principle of the defect detection process.

FIG. 2 shows the principle of the defect detecting process in the image processing apparatus 1.

FIG. 2(1) shows a gray-scale image of an object to be processed. This image contains an image 20 of a linear object (hereinafter referred to simply as "the linear object 20") equivalent to a defect. FIG. 2(2) shows in enlarged form the result of the edge extraction process executed on an image in the area 21 defined by dotted line on the gray-scale image. FIGS. 2(1) and 2(2) show a case in which the density of the linear object 20 is lower than that of the background.

The edge image of FIG. 2(2) is shown to include two edges E1 and E2 corresponding to the longitudinal contour lines of the linear object 20. This linear object 20, as shown in FIG. 2(1), is curved in shape, but the two edge lines E1 and E2 are considered to extend substantially parallel in the longitudinal direction with substantially the same line width. As shown in FIG. 2(2), therefore, consider an arbitrary point P1 on the edge E1 and a point P2 on the edge E2 corresponding to the point P1 along the direction B orthogonal to the edge direction. In the case where the corresponding point P2 on the edge E2 is extracted, the edges at these points P1 and P2 are regarded substantially parallel to each other.

In the case of FIG. 2, the density of the linear object 20 is lower than that of the background, and therefore the direction of density gradient at point P1 is along the direction B toward point P2. On the other hand, the direction of density gradient at point P2 is opposite to the direction B. In this way, as long as the two edges E1 and E2 are parallel to each other, the direction of density gradient at two points P1 and P2 in opposed relation between the edges E1 and E2 are opposite to each other.

As described above, the edge code indicates the direction orthogonal to the direction of density gradient. The relation of the direction of density gradient between points P1 and P2, therefore, can be replaced with equal effect by the equivalent relation of the edge codes. In FIG. 2(2), character A1 designates a vector indicating the direction defined by the edge code (hereinafter referred to as "the edge code vector") at point P1, and character A2 designates an edge code vector defined by the edge code at point P2. These vectors A1 and A2 are directed opposite to each other.

In the case where the linear object shown has a higher density than the background, the direction B of search from point P1 to point P2 (hereinafter referred to as "the search direction B") is opposite to the direction of density gradient at point P1. Also, the edge code vectors A1 and A2 at points P1 and P2 are also set in opposite directions.

The defect detection process according to this embodiment is explained with reference to FIG. 2(2).

According to this embodiment, the edge pixels on the image are sequentially considered, so that an edge pixel P2 having an opposite edge code to an edge pixel P1 under consideration is searched for from the edge pixel P1 in a range corresponding to the width W of the linear object to be detected, along the direction orthogonal to the edge code (the direction of density gradient or the opposite direction) of the edge pixel P1 under consideration. In the case where an edge pixel satisfying the search conditions is successfully extracted, a line segment having a predetermined length L is set in the direction C parallel to the edge code vector A1 associated with the edge pixel P1 under consideration with a point Q intermediate the extracted edge pixel P2 and the edge pixel P1 under consideration as an origin.

In this line segment setting process, the edge intensity of the edge pixel under consideration is added to the pixel value (initially zero) of each constituent pixel of the line segment to be set, in the memory area for the processing result image in the image memory 8.

Once the line segment setting process is executed for each edge pixel constituting the edges E1 and E2 of the linear object 20, the line segments associated with a plurality of neighboring edge pixels are superposed and connected to each other. The inclination of each line segment is parallel to the edge direction of a corresponding edge pixel. As long as the length of a line segment is proper, therefore, the image formed by superposition and connection described above (hereinafter referred to as "the assembled image") reflects the inclination and the curve of the linear object.

Each constituent pixel of the assembled image is set to a numerical value equivalent to the total edge intensity of the edge pixels corresponding to a plurality of line segments superposed. Therefore, the linear object can be distinguished easily from the other portions. According to this embodiment, at the time point when this process is finished for all the edge pixels on the input image, the processing result image is binarized by a predetermined threshold value, and this binary image is used for the measurement to determine the presence or absence of a defect and displayed on the monitor 3.

In the process of searching for a corresponding point, not only a pixel having an edge code 180 degrees different from the pixel under consideration but also a pixel having an edge code within a predetermined error range from the direction 180 degrees different are desirably extracted. Especially in the case where a linear object to be detected has a varying width or an irregularly uneven edge, the above-mentioned error is desirably set to a somewhat large value.

By this search process, the pixels constituting the edges of a linear object can be determined with high accuracy from all the edge pixels contained in a gray-scale image to be processed.

Next, the process for setting parameters to search for the corresponding point and set a line segment for the inspection of a linear defect based on the principle described above is explained with reference to FIGS. 3 and 4.

Figure 3:
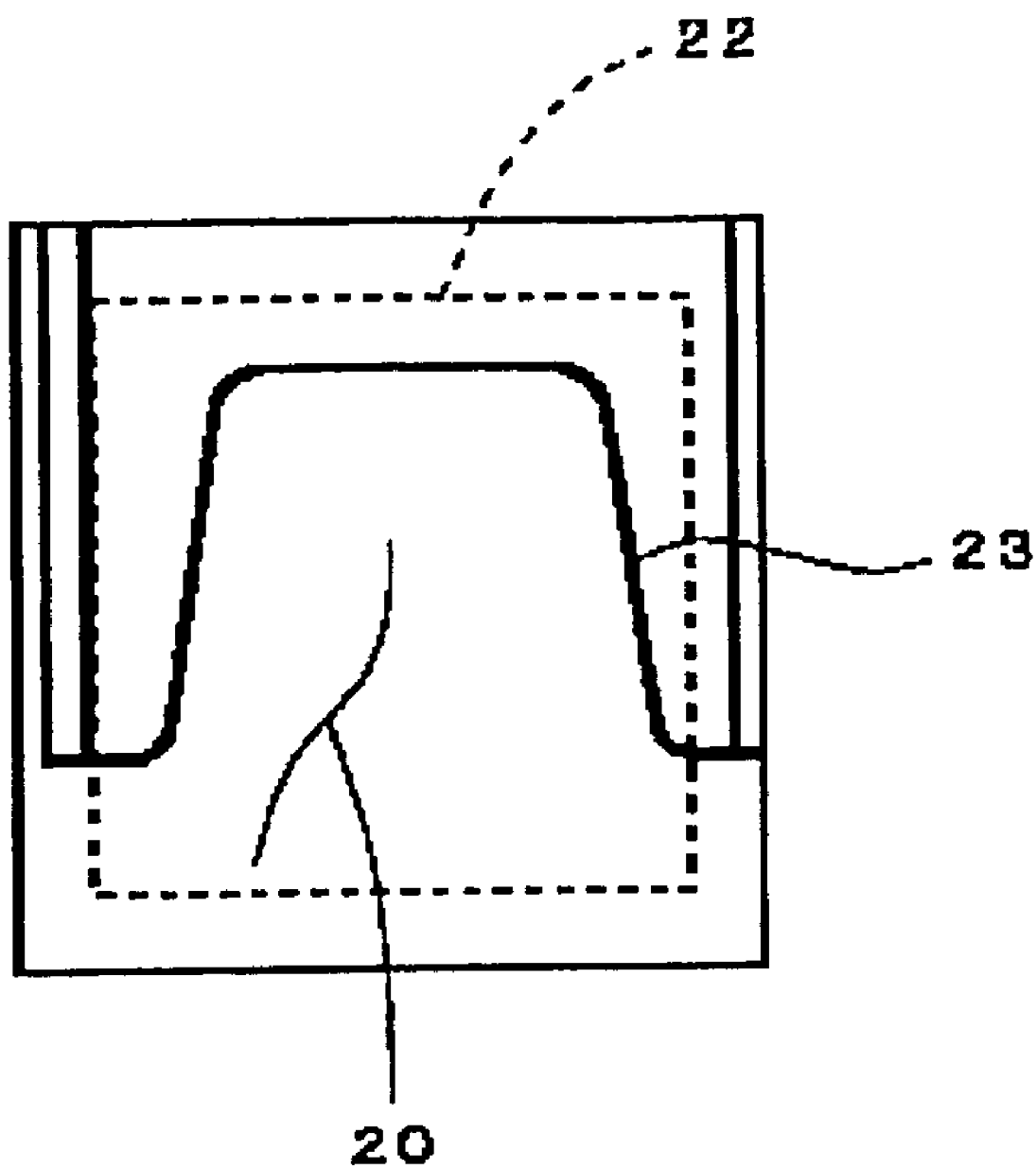
FIG. 3 is a diagram for explaining an example of an image to be processed.
Figure 4A:
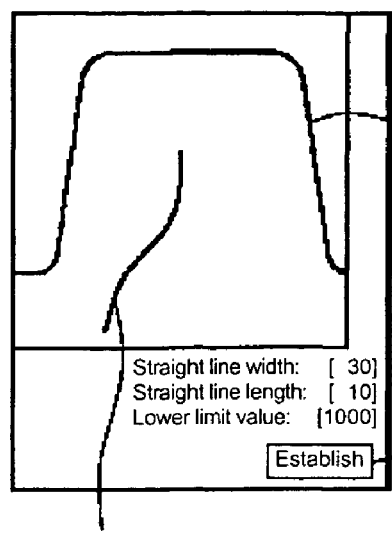
FIGS. 4A, 4B, and 4C are diagrams for explaining a display example of an image of the result of processing an image to be processed in FIG. 3, while changing the set value of parameters.
Figure 4B:
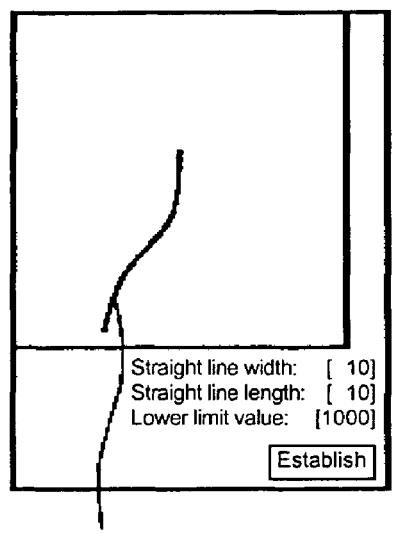
Figure 4C:
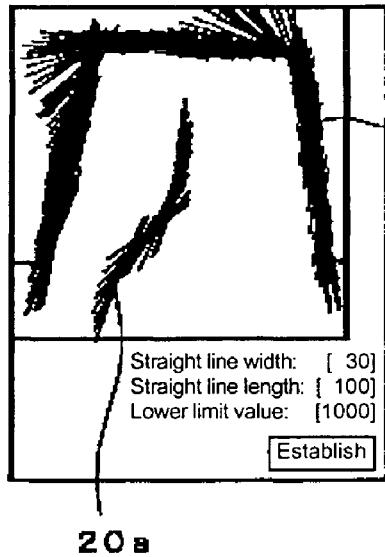

FIG. 3 shows a display screen of a gray-scale image to be processed. In FIG. 3, reference numeral 22 designates a measurement area set by the user. The image of FIG. 3, for the convenience of illustration, is shown as a binary image. Actually, however, it is an image having a density distribution (this gray-scale image is hereinafter referred to as "the image to be processed"). FIGS. 4A, 4B and 4C show display screens for the processing result image in the measurement area 22. The parameters used, a confirmation button 24 for establishing the parameters, etc. are displayed in the margin of the screen. The processing result images of FIG. 4 are shown in reverse video by way of illustration.

In FIG. 4, the "straight line width" is a parameter indicating the search range W for the process of searching for a corresponding point, and the "straight line length" is a parameter indicating the length L of the line segment set based on the vector C. Also, the "lower limit value" is a binary threshold value for binarizing the processing result image.

The image to be processed shown in FIG. 3 contains an image 23 of the contour portion of a neighboring object (hereinafter referred to as "the contour image 23") as well as the linear object 20 having a defect.

The processing result image shown in FIG. 4A contains assembled images 20a and 23a of the corresponding line segments for the linear object 20 and the contour image 23, respectively. Both the assembled images 20a and 23a reflect the geometry of the original images with high accuracy.

The processing result image of FIG. 4B, on the other hand, shows the result of the redetection process executed with a smaller straight line width W than in the case of FIG. 4A. In this image, the assembled image 23a corresponding to the contour image 23 with a large line width has disappeared and only the assembled image 20a corresponding to a linear object 20 having a small line width is displayed.

The processing result image of FIG. 4C shows the result of the redetection process executed with a larger straight line length L than in the case of FIG. 4A. Also in this image, like FIG. 4A, the assembled images 20a and 23a corresponding to the linear object 20 and the contour image 23, respectively, are displayed. Since the set value of the straight line width L is excessively large, however, a noise component departing from the original shape of the original image is generated.

As described above, the set values of the straight line width W and the straight line length L provide crucial parameters for determining the detection accuracy of the linear object. The lower limit value providing a binary threshold level of the processing result image, though fixed in FIGS. 4A to 4C, may be changed to adjust the degree of the noises appearing with the edge pixels erroneously extracted by the process of searching for the corresponding point (this lower limit value is hereinafter referred to as "the lower limit value S").

In the image processing operation according to this embodiment, as shown in FIG. 4, the set values of the parameters including the straight line width W, the straight line length L and the lower limit value S in the setting mode before full-scale inspection are changed, while generating the processing result image corresponding to the set values and displaying the same result image on the monitor 3. The user watching the monitor 3 adjusts the value of each parameter, and then establishes the set value by operating the confirmation button 24. By this confirming operation, the set value of each parameter is stored in the flash memory 9, and based on these set values, a defect inspection is conducted. In the setting mode, the processing result image for display is generated by executing the steps ST1 to ST13 in FIG. 5. The detail of these steps is not described below.

Figure 5:
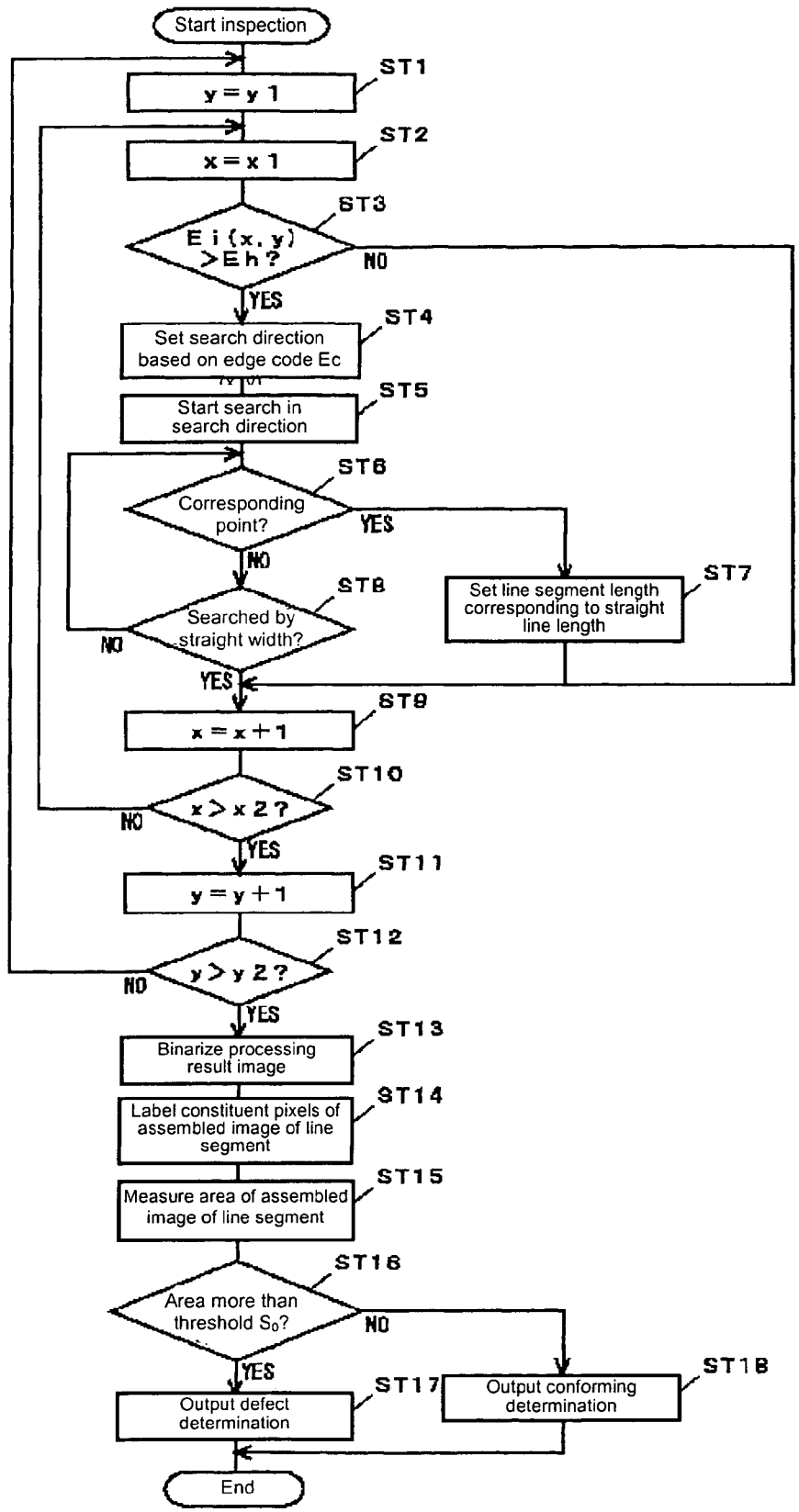
FIG. 5 is a flowchart showing the steps of the defect inspection process.

FIG. 5 shows the processing steps of inspection in the image processing apparatus 1.

This inspection process is executed at the time point after an analog image signal is fetched from the camera 2 into the camera interface 12 and converted into digital form and further the extraction process by the edge intensity extraction unit 6 and the edge code extraction unit 7 is terminated. In the description that follows and FIG. 5, each step is designated as "ST".

First, in steps ST1 and ST2, the coordinate (x, y) of the pixel under consideration is set to the position (x1, y1) at the upper left corner in the measurement area 22, and after that, the process described below is repeated until the pixel under consideration reaches a position (x2, y2) at the lower right corner in the measurement area.

In step ST3, the edge intensity Ei(x, y) of the pixel under consideration is checked using the edge intensity image. In the case where the edge intensity Ei(x, y) is larger than a predetermined threshold value Eh, the process proceeds to the next step ST4, while in the case where the edge intensity Ei(x, y) is not larger than the threshold value Eh, on the other hand, the steps including and subsequent to step ST4 are skipped, and the process proceeds to step ST9 to change the pixel under consideration.

In step ST4, the edge code Ec(x, y) of the pixel under consideration is read out using the edge code image, and the direction of search is set with reference to the edge code Ec(x, y). According to this embodiment, the edge code and the direction of density gradient are expressed with the direction along the positive X direction as 0 degree. In the case where a linear object has a lower density than the background, the direction equivalent to the edge code Ec(x, y) plus 90 degrees is set as the search direction. In the case where a linear object has a higher density than the background, on the other hand, the direction equivalent to the edge code Ec(x, y) less 90 degrees is determined as the search direction.

Once the search direction is determined, in step ST5, the pixels are scanned one by one from the pixel under consideration along the search direction using the edge code image again, and the edge code for each scanning position is compared to the edge code Ec(x, y) of the pixel under consideration. In the case where the difference between the two edge codes assumes a numerical value within the allowable error range with respect to 180 degrees, the current scanning position is regarded as a point corresponding to the pixel under consideration, and the answer in step ST6 is determined as YES.

In the case where the edge code at the scanning position fails to meet the conditions described above, on the other hand, the answer in step ST6 is NO thereby to check whether the search has been conducted over the straight line width W. In the case where the answer is NO, one pixel is scanned in the search direction, and step ST6 is executed again.

Once a corresponding point is extracted within the range of the straight line width W in this way, the scanning process is terminated immediately, and the process proceeds to step ST7. In step ST7, the line segment setting process is executed based on the edge code Ec(x, y) and the straight line length L with the intermediate point (point Q in FIG. 2(2)) between the pixel under consideration and the corresponding point as an origin. This line segment setting process is executed by adding the edge intensity Ei(x, y) to the value of the pixels constituting the line segment in the memory area for the processing result image, as described above.

In similar fashion, a point corresponding to each of the edge pixels having an edge intensity higher than the threshold value Eh in the measurement area 22 is sequentially searched, and the line segment setting process is executed for each of the edge pixels for which the corresponding point has been extracted by the search process. At the end of the setting process in the measurement area, the answer in step ST12 turns YES, and the process proceeds to step ST13, where each pixel of the processing result image is binarized based on the lower limit value S.

In the next step ST14, the pixels of the binarized processing result image that have exceeded the lower limit value S and have been set to "1" are extracted, and an image area having a successive train of these pixels is cut out and labeled. Further, in step ST15, the area of the image area thus labeled is calculated. In step ST16, the calculation result is checked to see whether it exceeds a predetermined threshold value $S_0$ or not. In the case where the calculation result exceeds the threshold value $S_0$, the process proceeds to step ST17, where a signal indicating a defect is output. In the case where the calculation result is not more than the threshold value $S_0$, on the other hand, the process proceeds to step ST18, where a signal indicating no defect is output. The assembled image labeled in step ST14 is not limited to one but a plurality of assembled images may be involved. In the case where the area of any one of the assembled images exceeds the threshold value $S_0$, the determination in step ST16 turns YES.

Before conducting the inspection and setting the parameters, the process of setting the measurement area 22 and the process of setting the direction of searching for a corresponding point are required to be executed. The measurement area, however, may be the whole image. Also, the direction of searching for a corresponding point is not limited to one, but may be both the direction of the edge code Ec(x, y) plus and minus 90 degrees.

Also, the origin from which a line segment is set is not necessarily a point intermediate the edge pixel under consideration and a corresponding edge pixel, but any of these pixels. As another alternative, a plurality of line segments may be set between these pixels. Further, the direction in which the line segment is extended is not limited to one, but a plurality of line segments may be extended in two directions from the origin.

Further, in the case where a point corresponding to the edge pixel under consideration is found in step ST6 in FIG. 5, the execution of step ST7 may be followed by the process of rewriting the edge intensity at the corresponding point to an edge intensity not verified as an edge pixel such as the threshold value Eh or 0. By doing so, a set of the opposed edge pixels are prevented from being subjected to the search process or the line segment setting process for the second time. Thus, the process is executed at higher speed.

In the case where an edge pixel extracted as a corresponding point is not subjected to the subsequent process in this way, a line segment extending in two directions from the origin is desirably set in step ST7.

In the defect inspection based on the techniques described with reference to FIGS. 2 to 5 above, once the parameters are properly set, as shown in FIG. 4B, an image having substantially the same features as the shape of the linear object can be generated by an assembled image of the line segments reflecting the inclination at each position of the edge in the longitudinal direction of the linear object. Thus, not only a defective rectilinear object but also a defective linear object curved in shape such as a hair and thread waste or having an uneven surface like a cracking can be detected with high accuracy.

In this line segment setting process, a line segment is set with a weighted edge intensity of the edge pixel under consideration. In the case where the edge intensity of each edge pixel is small due to a low contrast of the input image, therefore, the superposition of line segments can increase the weight of the assembled image against the background, thereby making it possible to generate an image having a defect clear in both shape and size.

Assume that an edge has developed a drop-off with a smaller edge intensity than the threshold value Eh. As long as the straight line length is set to a sufficiently large value, however, the inclination of the drop-off portion can be complemented by connecting the line segments associated with the neighboring edge pixels. Without the process of integrating the line segments, therefore, the defect including the drop-off portion can be detected by the algorithm for the normal inspection process. A highly accurate inspection can thus be conducted without increasing the burden of the control operation on the CPU 5.

Further, according to this embodiment, the set values of the parameters are input while watching the image displayed on the monitor 3. As an alternative, the parameters can be set automatically by following the steps shown in FIG. 6.

Figure 6:
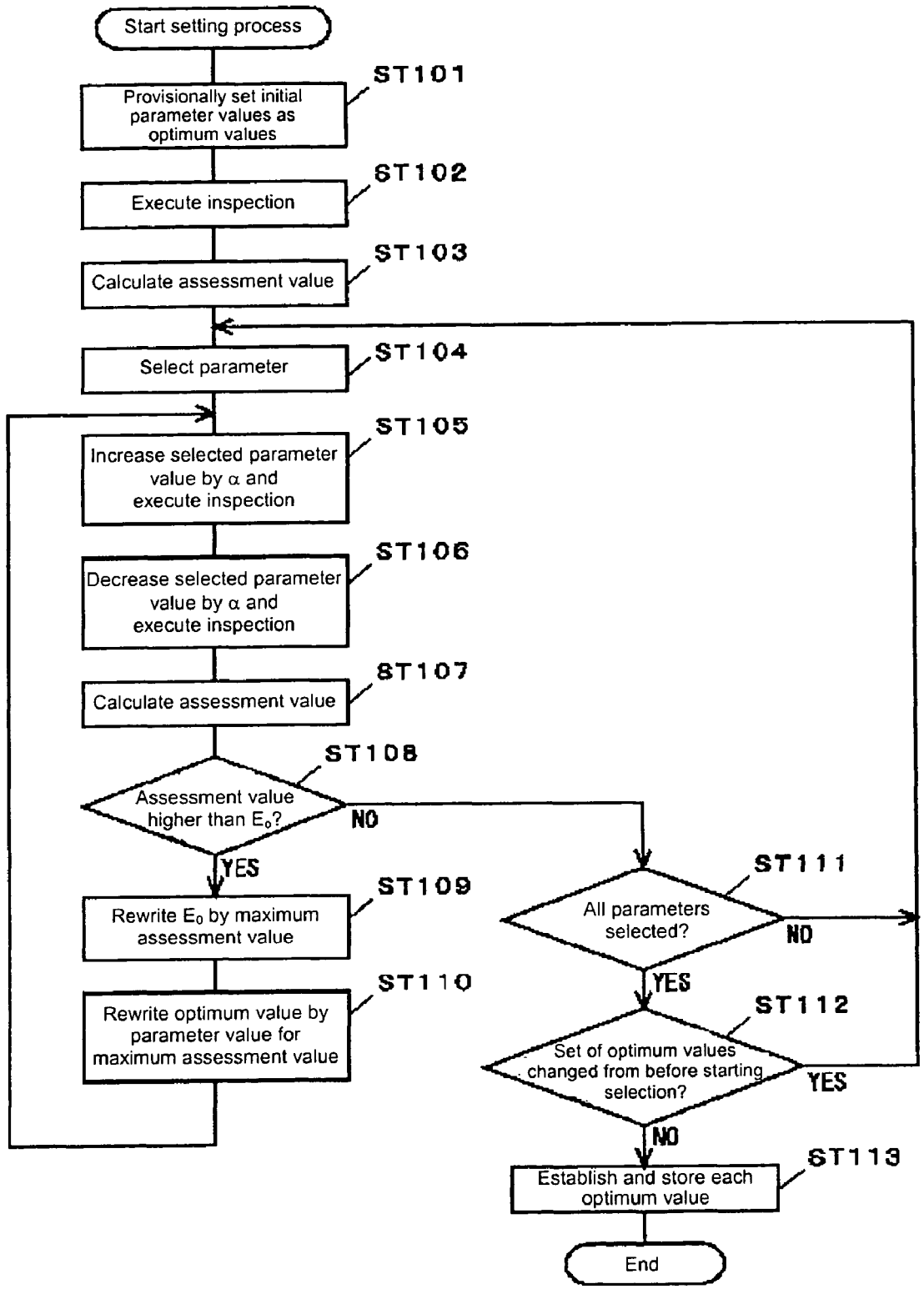
FIG. 6 is a flowchart showing the steps of the process for automatically setting parameters.

The steps shown in FIG. 6 employ what is called "the hill-climbing method". Prior to execution of these steps, a plurality of model gray-scale images (hereinafter referred to as "the model images") including a defect are inserted in the image processing apparatus 1, and a binary image indicating whether each pixel of the model images has a defect or not (hereinafter referred to as "the model defect image") is set for each of these model images. The model defect image is generated by the user operation of designating the defect position on the model images. For example, the model images are sequentially displayed on the monitor 3, while the user is instructed to designate a plurality of defective points on the contour lines on the display screen. The pixels in the image area formed by connecting the designated points are set to "1", and the pixels outside the area are set to "0". In this way, the model defect image can be generated. (In designating the points on the contour lines, it is recommended that the image be displayed in enlarged form.)

In FIG. 6, the steps (ST) are designated by numerals including and subsequent to 101.

Upon complete input of the model images and generation of the model defect images as described above, the process proceeds to step ST101 where the initial values of the parameters such as the straight line width W, the straight line length L and the lower limit value S are read out and provisionally set as optimum values of the respective parameters. The default parameter values held in the flash memory 9 may be used as the initial values of the parameters.

Next, in step ST102, each model image is inspected using the optimum values of the parameters. In the inspection process for each model image, the steps similar to those shown in FIG. 5 are executed, after which a binary inspection result image is generated in which the constituent pixels of an assembled image determined as defective (an assembled image of a size exceeding the area $S_0$) are set to "1" and the other pixels to "0".

Upon completion of the inspection, the assessment value $E_0$ of the inspection is calculated. The assessment value $E_0$ is determined from equation (1) below using the inspection result image of each model image and the model defect image. Equation (1) is also used in steps ST105 and ST106, and therefore the assessment value is generally expressed as E.

$$E = \sum_{}^{T} \sum_{}^{N} M_{TN} \quad (1)$$

In equation (1) above, character N designates the number of pixels constituting the model image, character T the number of model images, and $M_{TN}$ the result of determination for each pixel on each model image. The determination result is obtained by comparing the inspection result image generated from the model image to the model defect image. Specifically, in the case where the same value is set to the corresponding pixels between the inspection result image and the model defect image, $M_{TN}$ is determined as +1, while in the case where different values are set, $M_{TN}$ is determined as −1.

In the next step ST104, selected one of the parameters including the straight line width W, the straight line length L and the lower limit value S is selected. Assume that the straight line width W is selected, for example. In step ST105, the selected parameter is set to a value larger by an arbitrary number α than the optimum value, and the inspection is conducted by a similar method to step ST102. In step ST106, the parameter is set to a value lower by α than the optimum value, and the inspection is conducted similarly.

In step ST107, the assessment values are calculated by equation (1) based on the result of the inspection conducted in steps ST105 and ST106. In the case where at least one of the assessment values is higher than the assessment value $E_0$ described above, the process proceeds from step ST108 to step ST109, where the value $E_0$ is rewritten by the largest one of the three assessment values. Further, in step ST110, the optimum value of the selected parameter is rewritten by the parameter value obtained by rewriting the value $E_0$.

After that, returning to step ST105, the process similar to the one described above is repeatedly executed. In the case where the assessment value $E_0$ increases beyond the assessment value of the inspection result of steps ST105 and ST106 at a predetermined time point, the process returns from ST108 through ST111 to ST104 for selecting a second parameter (say, L). Once the optimum value of this parameter and the largest value of the assessment value $E_0$ are determined by the similar process, the process is returned again through steps ST108 and ST111 to ST104, where a third parameter (say, S) is selected and a similar process is executed.

After all the parameters are selected in this way, the answer in step ST111 turns YES, and in the next step ST112, the current optimum value of each parameter is compared to the optimum value as of the time point when the first parameter W is selected. In the case where the sets of optimum values are different from each other, the process returns to step ST104 and the first parameter is selected again.

In similar fashion, the process of steps ST104 to ST112 is repeated until the assessment value $E_0$ and the optimum values of the parameters are fixed. Once the assessment value $E_0$ and the optimum value of each parameter come to be fixed, the process advances from ST112 to ST113, and the optimum value of each parameter as of the prevailing time point is established as a set value of the inspection parameter and stored in the flash memory 9.

It will thus be understood from the foregoing description that with the image processing method and the image processing apparatus according to this invention, a curved linear object and a finely uneven linear object as well as a rectilinear object can be easily and accurately detected. Also, even with regard to an image having a low accuracy of edge extraction of a linear object, the linear object can be detected with high accuracy according to an ordinary algorithm by adjusting the parameters. Thus, the process of detecting a linear object can be executed with higher speed without increasing the burden of the control operation.

What is claimed is:

1. An image processing method for detecting a linear object on a gray-scale image,
wherein edge pixels of the gray-scale image having an edge direction are extracted, and while considering the extracted edge pixels sequentially, an edge pixel verified based on verification conditions to have a density gradient direction opposite to the edge pixel under consideration is searched for within a predetermined range in the direction orthogonal to a edge direction of the edge pixel under consideration, and when an edge pixel satisfying the verification conditions is extracted, a line segment is set in parallel to the edge direction of the edge pixel under consideration and passing through a predetermined position from the extracted edge pixel to the edge pixel under consideration, and
wherein an image indicating the result of setting the line segment is displayed as a linear object detection result when there is no edge pixels to be considered.

2. The image processing method according to claim 1, wherein the input of a numerical value indicating the conditions for setting the search range in the search process is received.

3. The image processing method according to claim 1, wherein the input of a numerical value indicating the conditions for setting a line segment is received.

4. The image processing method according to claim 1, wherein an image indicating the result of setting the line segment is produced by adding a numerical value corresponding to the edge intensity of the edge pixel under consideration to the density value of the pixels constituting the line segment to be set in the line segment setting process.

5. The image processing method according to claim 4, wherein an image indicating the result of setting the line segment is binarized by a predetermined threshold value when there is no edge pixels to be considered, and the resultant binary image is displayed as a linear object detection result.

6. The image processing method according to claim 1, wherein the edge intensity of the edge pixel under consideration is reflected in selected one of the length and the width of the line segment to be set in the line segment setting process.

7. The image processing method according to claim 1, wherein upon extraction of an edge pixel satisfying the verification conditions by the search process, the edge pixel extracted is set as a considered edge pixel after the line segment setting process.

8. An image processing method for detecting a linear object on a gray-scale image,
wherein edge pixels of the gray-scale image having an edge direction are extracted, and while the extracted edge pixels are sequentially considered, an edge pixel verified based on verification conditions to have a density gradient direction opposite to an edge pixel under consideration is searched for within a predetermined range in the direction orthogonal to a edge direction of the edge pixel under consideration, and upon extraction of an edge pixel satisfying the verification conditions, a line segment is set which is in parallel to the edge direction of the edge pixel under consideration and passes through a predetermined position from the extracted edge pixel to the edge pixel under consideration, and
wherein selected one of the position and the size of the linear object on the gray-scale image is detected based on the result of setting the line segment when there is no edge pixels to be considered.

9. The image processing method according to claim 1, comprising the steps of:
inputting a predetermined number of gray-scale images including an image of a linear object;
receiving the operation of designating a linear object on each of the gray-scale images;
executing the search process and the line segment setting process for each of the input gray-scale images while changing the values of the parameters for the respective processes, and executing the linear object detection process based on the result of setting the line segment; and
selecting an optimum set of parameter values based on the result of detecting and designating a line object for each gray-scale image;
wherein the parameters for the search process are numerical values indicating the search range setting conditions, and the parameters for the line segment setting process are numerical values indicating the line segment setting conditions.

10. An apparatus for detecting a linear object on a gray-scale image, comprising:
image input means for inputting a gray-scale image to be processed;
display means for displaying the result of detecting a linear object in the input gray-scale image;
edge pixel detection means for detecting edge pixels on the gray-scale image having an edge direction;
search means for considering a predetermined edge pixel and searching for an edge pixel verified based on verification conditions to have a density gradient direction opposite to the edge pixel under consideration within a predetermined range in a direction orthogonal to the edge direction of the edge pixel under consideration;
line segment setting means for setting a line segment parallel to the edge direction of the edge pixel under consideration at a predetermined position from the extracted edge pixel to the edge pixel under consideration upon extraction of an edge pixel satisfying the verification conditions by the search means; and
control means for sequentially considering the edge pixels detected by the edge pixel detection means, activating the search means and the line segment setting means, and displaying on the display means an image indicating the result of setting the line segment by the line segment setting means when there is no edge pixels to be considered.

11. The image processing apparatus according to claim 10, further comprising:
input means for inputting the parameters used for the process of detecting a linear object;
wherein the input means inputs a numerical value indicating the search range setting conditions as a parameter for the search process executed by the search means.

12. The image processing apparatus according to claim 11,
wherein the input means inputs a numerical value indicating the line segment setting conditions as a parameter for the line segment setting process executed by the line segment setting means.

13. The image processing apparatus according to claim 10,
wherein the control means extracts the pixels which constitute at least a predetermined number of line segments set by the line segment setting means and superposed one on the other when there is no edge pixels to be considered, and generates and displays on the display means a binary image by separating the extracted pixels from other pixels.

14. The image processing apparatus according to claim 10,
wherein the line segment setting means adds a numerical value corresponding to the edge intensity of an edge pixel under consideration to the density value of the pixels constituting a line segment to be set and generates an image indicating the result of setting the line segment.

15. The image processing apparatus according to claim 10,
wherein the line segment setting means adds a numerical value corresponding to the edge intensity of an edge pixel under consideration to the density value of the pixels constituting a line segment to be set and generates an image indicating the result of setting the line segment, and the control means binarizes an image indicating the result of setting the line segment by a predetermined threshold value when there is no edge pixels to be considered and displays the resulting binary image on the display means.

16. The image processing apparatus according to claim 10,
wherein the control means includes a post-consideration setting means which upon extraction of an edge pixel satisfying the verification conditions by the search means, sets the extracted edge pixel as a post-consideration edge pixel after complete execution of the line segment setting process by the line segment setting means.

17. The image processing apparatus according to claim 10, further comprising:
detection means for detecting selected one of the size and the position of a linear object on the gray-scale image based on the result of setting a line segment by the line segment setting means.

18. The image processing apparatus according to claim 17, further comprising:
determining means for determining the presence or absence of a linear object based on the detection result of the detection means and output means for outputting the result of determining the presence or absence by the determining means.

19. The image processing apparatus according to claim 10, further comprising:
parameter setting means for setting an optimum value of each parameter in numerical value indicating the search range setting conditions in the search process by the search means and the line segment setting conditions in the line segment setting process by the line segment setting means;
wherein the parameter setting means includes designating operation means for performing the operation of designating the linear object on a gray-scale image including the linear object input by the image input means, detection control means for operating the search means and the line segment setting means while changing the values of the parameters for the process executed by the search means and the line segment setting means for a plurality of gray-scale images subjected to the designating operation, while at the same time executing the linear object detection process based on the result of setting the line segment, and select means for selecting an optimum set of parameter values based on the detection result for each gray-scale image and the result of designating the linear object.

* * * * *